(12) United States Patent
Chen et al.

(10) Patent No.: US 11,614,013 B2
(45) Date of Patent: Mar. 28, 2023

(54) TWC CATALYSTS FOR GASOLINE ENGINE EXHAUST GAS TREATMENTS

(71) Applicants: JOHNSON MATTHEY PUBLIC LIMITED COMPANY, London (GB); JOHNSON MATTHEY (SHANGHAI) CHEMICALS LIMITED, Shanghai (CN)

(72) Inventors: Hai-Ying Chen, Wayne, PA (US); Hongyu Ji, Shanghai (CN); Dongsheng Qiao, Shanghai (CN); Eric Tyo, Wayne, PA (US); Takashi Yamada, Tochigi (JP); Xiang Zheng, Shanghai (CN)

(73) Assignees: Johnson Matthey Public Limited Company, London (GB); Johnson Matthey (Shanghai) Chemicals Limited, Shanghai (CN)

( * ) Notice: Subject to any disclaimer, the term of this patent is extended or adjusted under 35 U.S.C. 154(b) by 94 days.

(21) Appl. No.: 17/249,097

(22) Filed: Feb. 19, 2021

(65) Prior Publication Data
US 2021/0262371 A1 Aug. 26, 2021

Related U.S. Application Data

(60) Provisional application No. 62/982,309, filed on Feb. 27, 2020.

(51) Int. Cl.
*B01J 23/42* (2006.01)
*B01J 23/44* (2006.01)
(Continued)

(52) U.S. Cl.
CPC .............. *F01N 3/101* (2013.01); *B01J 23/42* (2013.01); *B01J 23/44* (2013.01); *B01J 23/464* (2013.01);
(Continued)

(58) Field of Classification Search
CPC . B01J 23/42; B01J 23/44; B01J 23/464; B01J 35/1014; F01N 3/101
(Continued)

(56) References Cited

U.S. PATENT DOCUMENTS 5,128,306 A * 7/1992 Dettling .................. B01J 23/63
423/213.5
5,597,771 A * 1/1997 Hu ........................... B01J 23/63
502/333

(Continued)

FOREIGN PATENT DOCUMENTS

WO 2019109999 A1 6/2019

*Primary Examiner* — Cam N. Nguyen
(74) *Attorney, Agent, or Firm* — Ni Yan

(57) ABSTRACT

A three-way catalyst article, and its use in an exhaust system for internal combustion engines, is disclosed. The catalyst article for treating exhaust gas comprising: a substrate comprising an inlet end and an outlet end with an axial length L; a first catalytic region comprising a first platinum group metal (PGM) component and a first oxygen storage capacity (OSC) material, wherein the first OSC material has a fresh specific surface area (SSA) of at least 10 m$^2$/g; and wherein the first OSC material has an SSA difference of no more than 30 m$^2$/g between the fresh first OSC material and the aged first OSC material.

20 Claims, 9 Drawing Sheets

(51) Int. Cl.
  *B01J 23/46* (2006.01)
  *B01J 35/10* (2006.01)
  *F01N 3/10* (2006.01)
(52) U.S. Cl.
  CPC ....... *B01J 35/1014* (2013.01); *F01N 2370/02* (2013.01); *F01N 2510/0684* (2013.01)
(58) Field of Classification Search
  USPC ....... 502/304, 332–334, 339, 349, 355, 415, 502/439
  See application file for complete search history.

(56) References Cited

U.S. PATENT DOCUMENTS

| | | | | |
|---|---|---|---|---|
| 5,888,464 | A * | 3/1999 | Wu | B01D 53/945 423/239.1 |
| 6,528,451 | B2 * | 3/2003 | Brezny | B01J 23/002 502/340 |
| 9,387,461 | B2 * | 7/2016 | Wu | B01J 35/1038 |
| 9,597,666 | B2 * | 3/2017 | Wu | B01J 37/0221 |
| 10,201,804 | B2 * | 2/2019 | Karpov | B01J 37/0213 |
| 10,634,030 | B2 * | 4/2020 | Li | B01J 37/0201 |
| 10,864,499 | B2 * | 12/2020 | Psaras | B01J 35/002 |
| 2012/0124975 | A1 * | 5/2012 | Wei | B01J 19/2485 60/297 |
| 2013/0336864 | A1 * | 12/2013 | Zheng | B01J 23/63 502/415 |
| 2019/0111389 | A1 * | 4/2019 | Camm | B01J 23/63 |

* cited by examiner

TWC CATALYSTS FOR GASOLINE ENGINE EXHAUST GAS TREATMENTS

FIELD OF THE INVENTION

The present invention relates to a catalyzed article useful in treating exhaust gas emissions from gasoline engines.

BACKGROUND OF THE INVENTION

Internal combustion engines produce exhaust gases containing a variety of pollutants, including hydrocarbons (HCs), carbon monoxide (CO), and nitrogen oxides ("$NO_x$"). Emission control systems, including exhaust gas catalytic conversion catalysts, are widely utilized to reduce the amount of these pollutants emitted to atmosphere. A commonly used catalyst for gasoline engine exhaust treatments is the TWC (three way catalyst). TWCs perform three main functions: (1) oxidation of CO; (2) oxidation of unburnt HCs; and (3) reduction of $NO_x$.

Despite advances in TWC technology, there remains a need for improved catalytic converters for certain engine platforms that simultaneously improve the performance in cold start stage, give better light off performance, and/or improve catalytic performances. This invention solves these problems amongst others.

SUMMARY OF THE INVENTION

One aspect of the present disclosure is directed to a catalyst composition comprising a platinum group metal (PGM) component and an oxygen storage capacity (OSC) material, wherein the OSC material has a fresh specific surface area (SSA) of at least 10 $m^2/g$; and wherein the OSC material has an SSA difference of no more than 30 $m^2/g$ between the fresh OSC material and the aged OSC material.

Another aspect of the present disclosure is directed to a catalytic article for treating exhaust gas comprising: a substrate comprising an inlet end and an outlet end with an axial length L; a first catalytic region comprising a first platinum group metal (PGM) component and a first oxygen storage capacity (OSC) material, wherein the first OSC material has a fresh specific surface area (SSA) of at least 10 $m^2/g$; and wherein the first OSC material has an SSA difference of no more than 30 $m^2/g$ between the fresh first OSC material and the aged first OSC material.

The invention also encompasses an exhaust system for internal combustion engines that comprises the three-way catalyst component of the invention.

The invention also encompasses treating an exhaust gas from an internal combustion engine, in particular for treating exhaust gas from a gasoline engine. The method comprises contacting the exhaust gas with the three-way catalyst component of the invention.

BRIEF DESCRIPTION OF THE DRAWINGS

FIG. 2b depicts a variation of FIG. 2a.

FIG. 3b depicts a variation of FIG. 3a.

FIG. 4b depicts a variation of FIG. 4a.

FIGS. 5b, 5c, and 5d depict variations of FIG. 5a.

FIGS. 6b and 6c depict variations of FIG. 6a.

FIGS. 7b-7f depict variations of FIG. 7a.

DETAILED DESCRIPTION OF THE INVENTION

Figure 1:
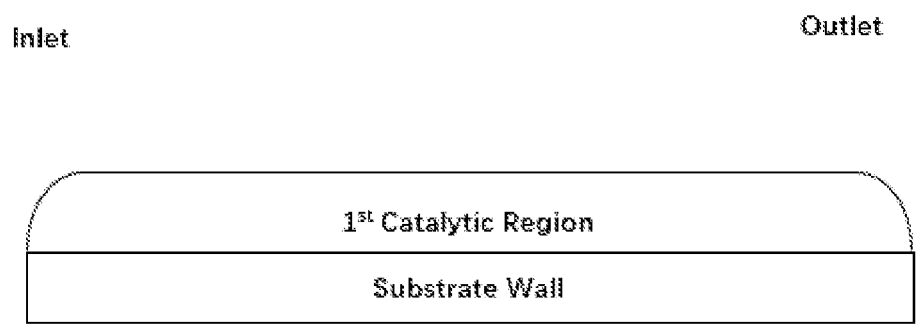
FIG. 1 shows one embodiment according to the present invention, which contains first catalytic region with a length of 100% to the axial length L of the substrate (single layer).
Figure 2A:
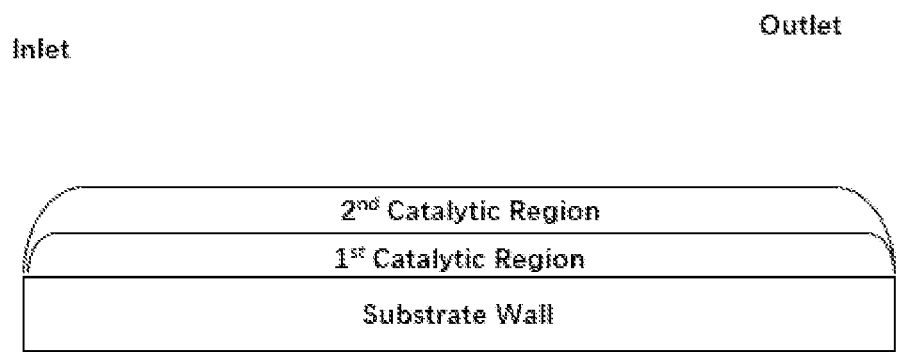
FIG. 2a shows one embodiment according to the present invention, the first catalytic region extends 100% of the axial length L, as bottom layer; the second catalytic region extends 100% of the axial length L, as top layer.
Figure 2B:
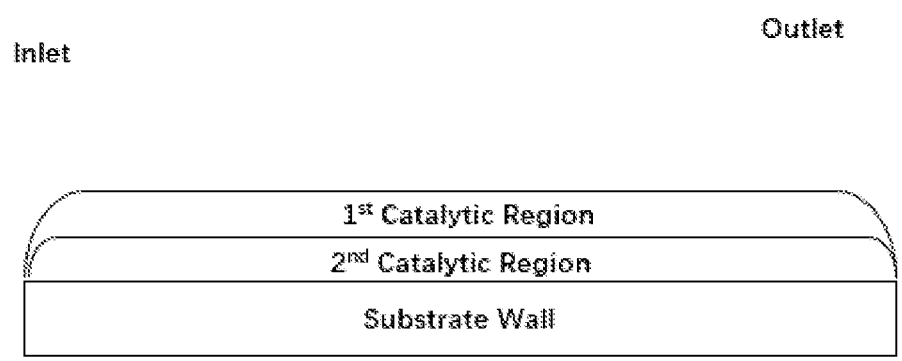

The present invention is directed to the catalytic treatment of combustion exhaust gas, such as that produced by gasoline and other engines, and to related catalysts compositions, catalytic articles, and systems. More specifically, the invention relates the simultaneous treatment of $NO_x$, CO, and HC in a vehicular exhaust system. Although, most of technology development to improve thermal durability of TWC have been focused on increasing a specific surface are (SSA) of OSC materials after thermal aging, the inventors have surprisingly discovered that reduction of an SSA difference between fresh and aged OSC is much impacting on the improved thermal durability of TWC and resulting emission control performance. The inventors have discovered that TWC potential performance under light off and OSC tests as well as the substantial performance under several emission control tests were improved with this invention. The processes of the present invention also reduce costs of the catalyst.

One aspect of the present disclosure is directed to a catalyst composition comprising a platinum group metal (PGM) component and an oxygen storage capacity (OSC) material, wherein the OSC material has a fresh specific surface area (SSA) of at least 10 $m^2/g$; and wherein the OSC material has an SSA difference of no more than 30 $m^2/g$ between the fresh OSC material and the aged OSC material.

Through intensive research, the inventors have found that by selecting and applying the specific types of OSC material to the TWC catalyst compositions, these novel compositions have demonstrated excellent catalytic properties (e.g., especially in $NO_x$ emission control during vehicle testing)

The PGM component can be selected from the group consisting of platinum, palladium, rhodium, and a mixture thereof. In some embodiments, the PGM component can be Pd, Rh or a mixture thereof.

The OSC material can be selected from the group consisting of cerium oxide, zirconium oxide, a ceria-zirconia mixed oxide, and an alumina-ceria-zirconia mixed oxide. More preferably, the OSC material comprises the ceria-zirconia mixed oxide. The ceria-zirconia mixed oxide can further comprise dopants, such as lanthanum, neodymium, praseodymium, yttrium oxides, etc. In addition, the OSC material may function as a support material for the PGM component.

The OSC material can have a fresh SSA of at least 15 $m^2/g$; at least 20 $m^2/g$; or, at least 25 $m^2/g$. The OSC material can have a fresh SSA of no more than 55 $m^2/g$; preferably, no more than 50 or 45 $m^2/g$; no more than 40 or 35 $m^2/g$; or, no more than 30 $m^2/g$. The OSC material can have a fresh SSA of 10-55 $m^2/g$; 20-50 $m^2/g$; 20-40 $m^2/g$; or, 20-30 $m^2/g$.

The OSC material can be aged under various conditions. For example, the OSC material can be aged at 1100° C. for 4 hours in an oven. The aged OSC material under such conditions can have an SSA of at least 10 $m^2/g$, 15 $m^2/g$, or 20 $m^2/g$. The aged OSC material under such conditions can have an SSA of 10-40 $m^2/g$, 15-35 $m^2/g$ or, 20-30 $m^2/g$. The OSC material can have an SSA difference of no more than 30 $m^2/g$, no more than 25 $m^2/g$, no more than 20 $m^2/g$, no more than 15 $m^2/g$, no more than 10 $m^2/g$, or no more than 5 $m^2/g$ between the fresh OSC material and the aged OSC material under such conditions. Alternatively, the OSC material can be aged under hydrothermal redox condition at 1000° C. for 4 hours. The aged OSC material under such conditions can be an SSA of at least 10 $m^2/g$, at least 15 $m^2/g$, or at least 20 $m^2/g$. The aged OSC material under such conditions can have an SSA of 10-40 $m^2/g$, 15-35 $m^2/g$, or 20-30 $m^2/g$. The OSC material can have an SSA difference of no more than 40 $m^2/g$, no more than 35 $m^2/g$, no more than 30, 25, 20, or 15 $m^2/g$; in certain embodiments, no more than 10 or 5 $m^2/g$ between the fresh OSC material and the aged OSC material under such conditions.

The catalyst composition may further comprise an inorganic oxide.

The inorganic oxide is preferably an oxide of Groups 2, 3, 4, 5, 13 and 14 elements. The inorganic oxide is preferably selected from the group consisting of alumina, magnesia, silica, ceria, barium oxides, and mixed oxides or composite oxides thereof. Particularly preferably, the inorganic oxide is alumina, lanthanum-alumina, ceria, or a magnesia/alumina composite oxide. One especially preferred inorganic oxide is alumina or lanthanum-alumina.

The OSC material and the inorganic oxide can have a weight ratio of no greater than 10:1, preferably, no greater than 8:1 or 5:1, more preferably, no greater than 4:1 or 3:1, most preferably, no greater than 2:1.

Alternatively, the OSC material and the inorganic oxide can have a weight ratio of 10:1 to 1:10, preferably, 8:1 to 1:8 or 5:1 to 1:5; more preferably, 4:1 to 1:4 or 3:1 to 1:3; and most preferably, 2:1 to 1:2.

The catalyst composition may further comprise an alkali or alkaline earth metal.

The alkali or alkaline earth metal is preferably barium, or strontium, and mixed oxides or composite oxides thereof. Preferably the barium or strontium, where present, is loaded in an amount of 0.1 to 15 wt %, and more preferably 3 to 10 wt % of barium or strontium, based on the total weight of the catalyst composition.

Preferably the barium or the strontium is present as $BaCO_3$ or $SrCO_3$. Such a material can be performed by any method known in the art, for example incipient wetness impregnation or spray-drying.

As demonstrated in the Examples below, the catalyst compositions in this aspect can be applied as a TWC catalyst for treating exhaust gas produced by gasoline engines.

Another aspect of the present disclosure is directed to a catalytic article for treating exhaust gas comprising: a substrate comprising an inlet end and an outlet end with an axial length L; a first catalytic region comprising a first platinum group metal (PGM) component and a first oxygen storage capacity (OSC) material, wherein the first OSC material has a fresh specific surface area (SSA) of at least 10 $m^2/g$; and wherein the first OSC material has an SSA difference of no more than 30 $m^2/g$ between the fresh first OSC material and the aged first OSC material.

First Catalytic Region

The first PGM component can be selected from the group consisting of platinum, palladium, rhodium, and a mixture thereof. In some embodiments, the first PGM component can be Pd, Rh or a mixture thereof.

The first OSC material can be selected from the group consisting of cerium oxide, zirconium oxide, a ceria-zirconia mixed oxide, and an alumina-ceria-zirconia mixed oxide. More preferably, the first OSC material comprises the ceria-zirconia mixed oxide. The ceria-zirconia mixed oxide can further comprise dopants, such as lanthanum, neodymium, praseodymium, yttrium oxides, etc. In addition, the first OSC material may function as a support material for the first PGM component. The ceria-zirconia mixed oxide can have a weight ratio of ceria dioxide to zirconia dioxide at least 25:75, preferably, higher than 35:65, more preferably, higher than 45:55.

The first OSC material can have a fresh SSA of at least 15 $m^2/g$; at least 20 $m^2/g$; or, at least 25 $m^2/g$. The first OSC material can have a fresh SSA of no more than 55 $m^2/g$; preferably, no more than 50 or 45 $m^2/g$; no more than 40 or 35 $m^2/g$; or, no more than 30 $m^2/g$. The first OSC material can have a fresh SSA of 10-55 $m^2/g$; 20-50 $m^2/g$; 20-40 $m^2/g$; or, 20-30 $m^2/g$.

The first OSC material can be aged under various conditions. For example, the first OSC material can be aged at 1100° C. for 4 hours in an oven. The aged first OSC material under such conditions can have an SSA of at least 10 $m^2/g$, 15 $m^2/g$, or 20 $m^2/g$. The aged first OSC material under such conditions can have an SSA of 10-40 $m^2/g$, 15-35 $m^2/g$ or, 20-30 $m^2/g$. The first OSC material can have an SSA difference of no more than 30 $m^2/g$, no more than 25 $m^2/g$, no more than 20 $m^2/g$, no more than 15 $m^2/g$, no more than 10 $m^2/g$, or no more than 5 $m^2/g$ between the fresh first OSC material and the aged first OSC material under such conditions. Alternatively, the first OSC material can be aged under hydrothermal redox condition at 1000° C. for 4 hours. The aged first OSC material under such conditions can be an SSA of at least 10 $m^2/g$, at least 15 $m^2/g$, or at least 20 $m^2/g$. The aged first OSC material under such conditions can have an SSA of 10-40 $m^2/g$, 15-35 $m^2/g$, or 20-30 $m^2/g$. The first OSC material can have an SSA difference of no more than 40 $m^2/g$, no more than 35 $m^2/g$, no more than 30, 25, 20, or 15 $m^2/g$; in certain embodiments, no more than 10 or 5 $m^2/g$ between the fresh first OSC material and the aged first OSC material under such conditions.

The first catalytic region may further comprise a first inorganic oxide.

The first inorganic oxide is preferably an oxide of Groups 2, 3, 4, 5, 13 and 14 elements. The first inorganic oxide is preferably selected from the group consisting of alumina, magnesia, silica, ceria, barium oxides, and mixed oxides or composite oxides thereof. Particularly preferably, the first inorganic oxide is alumina, lanthanum-alumina, ceria, or a magnesia/alumina composite oxide. One especially preferred first inorganic oxide is alumina or lanthanum-alumina.

The first OSC material and the first inorganic oxide can have a weight ratio of no greater than 10:1, preferably, no greater than 8:1 or 5:1, more preferably, no greater than 4:1 or 3:1, most preferably, no greater than 2:1.

Alternatively, the first OSC material and the first inorganic oxide can have a weight ratio of 10:1 to 1:10, preferably, 8:1 to 1:8 or 5:1 to 1:5; more preferably, 4:1 to 1:4 or 3:1 to 1:3; and most preferably, 2:1 to 1:2.

The first catalytic region may further comprise a first alkali or alkaline earth metal.

The first alkali or alkaline earth metal is preferably barium, or strontium, and mixed oxides or composite oxides thereof. Preferably the barium or strontium, where present, is loaded in an amount of 0.1 to 15 wt %, and more preferably 3 to 10 wt % of barium or strontium, based on the total weight of the first catalytic region.

Preferably the barium or the strontium is present as $BaCO_3$ or $SrCO_3$. Such a material can be performed by any method known in the art, for example incipient wetness impregnation or spray-drying.

The first catalytic region can extend for 100 percent of the axial length L. (E.g., see FIGS. 1, 2a, 2b, and 6a-6c). In some embodiments, the first catalytic region can extend for 20 to 99%, 30 to 90%, or 40-80% of the axial length L. Alternatively, the first catalytic region can extend for 30 to 70 percent of the axial length L. Preferably, for 40 to 60 percent, more preferably, 45 to 55 percent of the axial length L, (E.g., see FIGS. 3a-5d and 7a-7l).

The total washcoat loading of the first catalytic region can be less than 3.5 $g/in^3$, preferably, less than 3.0 $g/in^3$, 2.5 $g/in^3$, or 1.5 $g/in^3$.

Second Catalytic Region

The catalytic article may further comprise a second catalytic region.

The second catalytic region can further comprise a second PGM component, a second oxygen storage capacity (OSC) material, a second alkali or alkaline earth metal component, and/or a second inorganic oxide.

The second PGM component can be selected from the group consisting of platinum, palladium, rhodium, and a mixture thereof. In some embodiments, the second PGM component can be Pd, Rh or a mixture thereof.

The second OSC material is preferably selected from the group consisting of cerium oxide, zirconium oxide, a ceria-zirconia mixed oxide, and an alumina-ceria-zirconia mixed oxide. More preferably, the second OSC material comprises the ceria-zirconia mixed oxide. In addition, the second OSC material may further comprise one or more of dopants like lanthanum, neodymium, praseodymium, yttrium etc. Moreover, the second OSC material may have the function as a support material for the second PGM component. The ceria-zirconia mixed oxide can have a weight ratio of zirconia dioxide to ceria dioxide at least 50:50, preferably, higher than 60:40, more preferably, higher than 70:30. Alternatively, the ceria-zirconia mixed oxide also can have a weight ratio of ceria dioxide to zirconia dioxide less than 50:50, preferably, less than 40:60, more preferably, less than 30:70.

The second OSC material can have a fresh SSA of at least 15 $m^2/g$; at least 20 $m^2/g$; or, at least 25 $m^2/g$. The second OSC material can have a fresh SSA of no more than 55 $m^2/g$; preferably, no more than 50 or 45 $m^2/g$; no more than 40 or 35 $m^2/g$; or, no more than 30 $m^2/g$. The second OSC material can have a fresh SSA of 10-55 $m^2/g$; 20-50 $m^2/g$; 20-40 $m^2/g$; or, 20-30 $m^2/g$.

The second OSC material can be aged under various conditions. For example, the second OSC material can be aged at 1100° C. for 4 hours in an oven. The aged second OSC material under such conditions can have an SSA of at least 10 $m^2/g$, 15 $m^2/g$, or 20 $m^2/g$. The aged second OSC material under such conditions can have an SSA of 10-40 $m^2/g$, 15-35 $m^2/g$ or, 20-30 $m^2/g$. The second OSC material can have an SSA difference of no more than 30 $m^2/g$, no more than 25 $m^2/g$, no more than 20 $m^2/g$, no more than 15 $m^2/g$, no more than 10 $m^2/g$, or no more than 5 $m^2/g$ between the fresh second OSC material and the aged second OSC material under such conditions. Alternatively, the second OSC material can be aged under hydrothermal redox condition at 1000° C. for 4 hours. The aged second OSC material under such conditions can be an SSA of at least 10 m$^2$/g, at least 15 m$^2$/g, or at least 20 m$^2$/g. The aged second OSC material under such conditions can have an SSA of 10-40 m$^2$/g, 15-35 m$^2$/g, or 20-30 m$^2$/g. The second OSC material can have an SSA difference of no more than 40 m$^2$/g, no more than 35 m$^2$/g, no more than 30, 25, 20, or 15 m$^2$/g; in certain embodiments, no more than 10 or 5 m$^2$/g between the fresh second OSC material and the aged second OSC material under such conditions.

The second OSC material (e.g., ceria-zirconia mixed oxide) can be from 10 to 90 wt %, preferably, 25-75 wt %, more preferably, 30-60 wt %, based on the total washcoat loading of the second catalytic region.

The second OSC material loading in the second catalytic region can be less than 2 g/in$^3$. In some embodiments, the second OSC material loading in the second catalytic region is no greater than 1.5 g/in$^3$, 1.2 g/in$^3$, 1 g/in$^3$, 0.8 g/in$^3$, or 0.7 g/in$^3$.

The total washcoat loading of the second catalytic region can be less than 3.5 g/in$^3$, preferably, less than 3.0 g/in$^3$, 2.0 g/in$^3$, or 1.0 g/in$^3$.

The second alkali or alkaline earth metal is preferably barium, strontium, mixed oxides or composite oxides thereof. Preferably the barium or strontium, where present, is in an amount of 0.1 to 15 wt %, and more preferably 3 to 10 wt % of barium or strontium, based on the total weight of the second catalytic region.

It is even more preferable that the second alkali or alkaline earth metal is strontium. The strontium, where present, is preferably present in an amount of 0.1 to 15 wt %, and more preferably 3 to 10 wt %, based on the total weight of the second catalytic region.

It is also preferable that the second alkali or alkaline earth metal is mixed oxides or composite oxide of barium and strontium. Preferably, the mixed oxides or composite oxide of barium and strontium is present in an amount of 0.1 to 15 wt %, and more preferably 3 to 10 wt %, based on the total weight of the second catalytic region. It is more preferable that the second alkali or alkaline earth metal is composite oxide of barium and strontium.

Preferably the barium or strontium is present as BaCO$_3$ or SrCO$_3$. Such a material can be performed by any method known in the art, for example incipient wetness impregnation or spray-drying.

The second inorganic oxide is preferably an oxide of Groups 2, 3, 4, 5, 13 and 14 elements. The second inorganic oxide is preferably selected from the group consisting of alumina, magnesia, silica, ceria, barium oxides, and mixed oxides or composite oxides thereof. Particularly preferably, the second inorganic oxide is alumina, lanthanum-alumina, ceria, or a magnesia/alumina composite oxide. One especially preferred second inorganic oxide is alumina or lanthanum-alumina.

The second OSC material and the second inorganic oxide can have a weight ratio of no greater than 10:1, preferably, no greater than 8:1 or 5:1, more preferably, no greater than 4:1 or 3:1, most preferably, no greater than 2:1.

Alternatively, the second OSC material and the second inorganic oxide can have a weight ratio of 10:1 to 1:10, preferably, 8:1 to 1:8 or 5:1 to 1:5; more preferably, 4:1 to 1:4 or 3:1 to 1:3; and most preferably, 2:1 to 1:2.

The second catalytic region can extend for 100 percent of the axial length L. (E.g., see FIGS. 2a, 2b, and 6a-6c)

The second catalytic region can extend for 30 to 70 percent of the axial length L. Preferably, for 40 to 60 percent, more preferably, 45 to 55 percent of the axial length L. and most preferably, the total length of the second region and the first region is equal or greater than the axial length L (E.g., see FIGS. 3a-5d and 7a-7l).

Figure 3A:
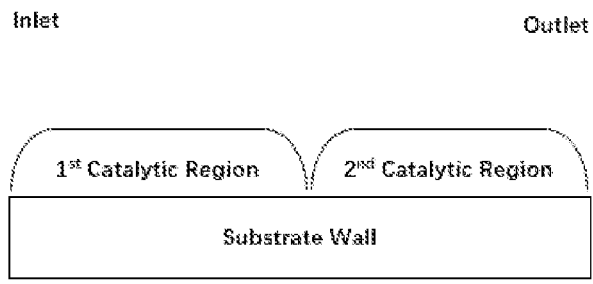
FIG. 3a shows one embodiment according to the present invention, the first catalytic region extends less than 100% of the axial length L, from the inlet end; the second catalytic region extends less than 100% of the axial length L, from the outlet end. The total length of the second and the first catalytic region is equal or less than the axial length L.
Figure 3B:
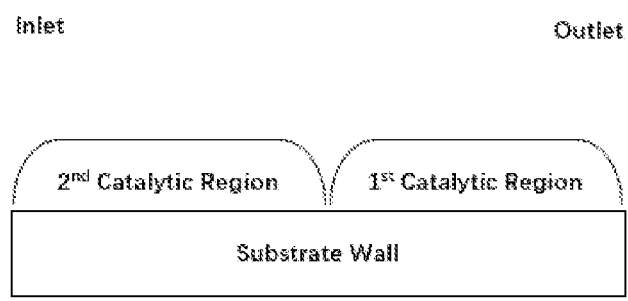
Figure 3C:
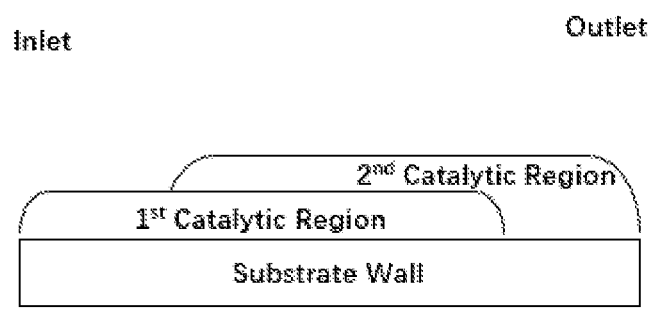
FIG. 3c shows one embodiment according to the present invention, the first catalytic region extends less than 100% of the axial length L, from the inlet end; the second catalytic region extends less than 100% of the axial length L, from the outlet end. The total length of the second and the first catalytic region is greater than the axial length L.
Figure 3D:
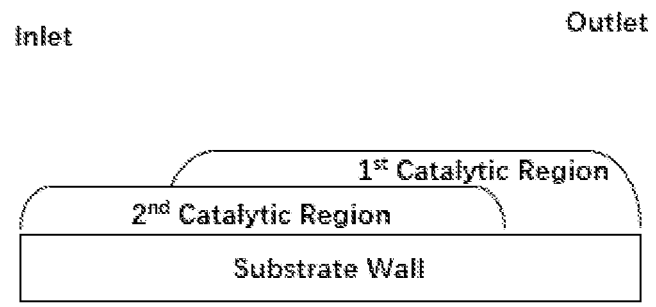
FIG. 3d depicts a variation of FIG. 3c.
Figure 4A:
FIG. 4a shows one embodiment according to the present invention, the first catalytic region extends less than 100% of the axial length L, from the inlet end; the second catalytic region extends less than 100% of the axial length L, from the outlet end. The total length of the second and the first catalytic region is less than or equal to the axial length L. The $3^{rd}$ catalytic region extends 100% of the axial length L and overlies the first and second catalytic regions as top layer.
Figure 4B:
Figure 4C:
FIG. 4c shows one embodiment according to the present invention, the $3^{rd}$ catalytic region extends 100% of the axial length L as bottom layer. The first catalytic region extends less than 100% of the axial length L, from the inlet end; the second catalytic region extends less than 100% of the axial length L, from the outlet end. The total length of the second and the first catalytic region is less than or equal to the axial length L.
Figure 4D:
FIG. 4d depicts a variation of FIG. 4c.
Figure 5A:
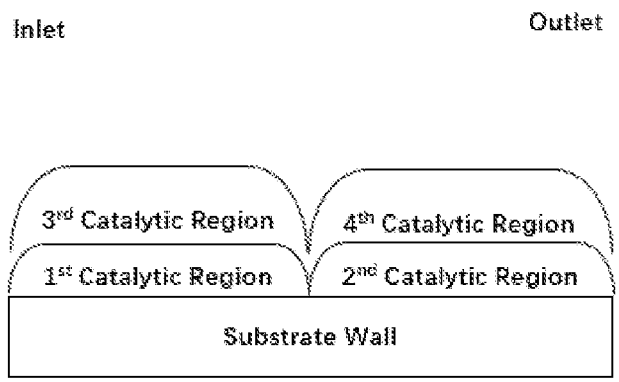
FIG. 5a shows one embodiment according to the present invention, the first catalytic region extends less than 100% of the axial length L, from the inlet end; the second catalytic region extends less than 100% of the axial length L, from the outlet end. The total length of the second and the first catalytic region can be less than, equal to, or greater than the axial length L. The third catalytic region extends less than 100% of the axial length L, from the inlet end; the fourth catalytic region extends less than 100% of the axial length L, from the outlet end. The total length of the third and the fourth catalytic region can be less than, equal to, or greater than the axial length L. The first and second catalytic regions constitutes bottom layer; and the third and fourth catalytic regions constitutes top layer.
Figure 5B:
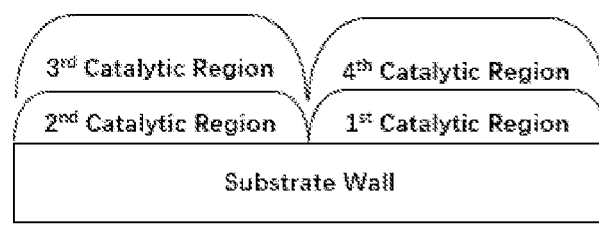
Figure 5C:
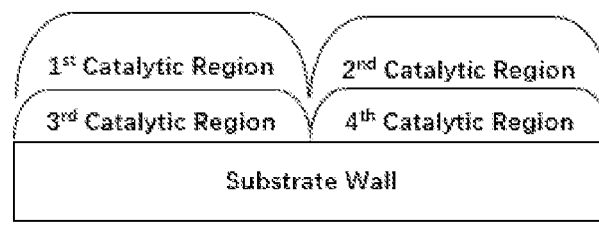
Figure 5D:
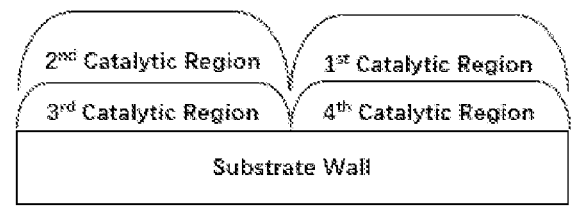
Figure 6A:
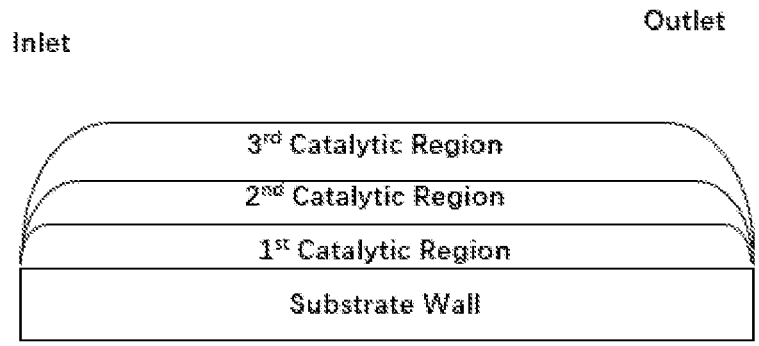
FIG. 6a shows one embodiment according to the present invention, the first catalytic region extends 100% of the axial length L, as bottom layer; the second catalytic region extends 100% of the axial length L, as middle layer; and the third catalytic region extends 100% of the axial length L, as top layer.
Figure 6B:
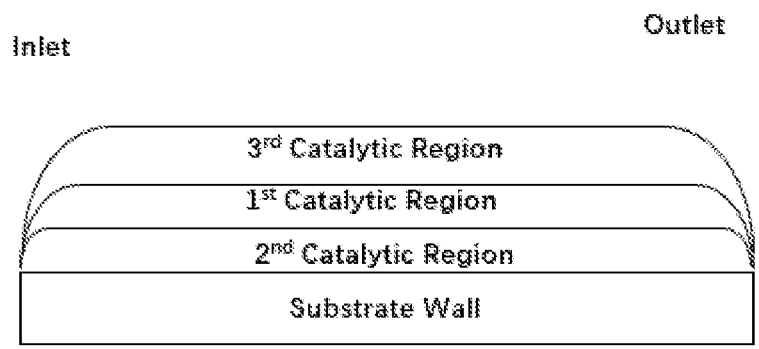
Figure 6C:
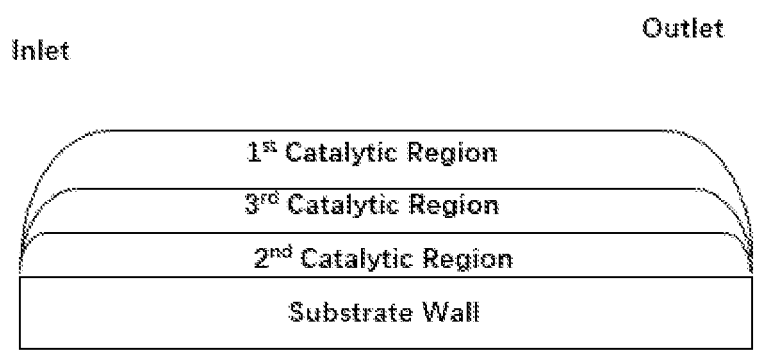
Figure 7A:
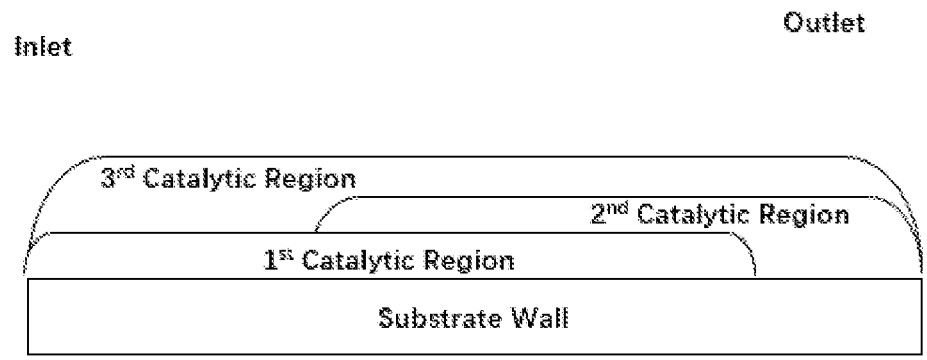
FIG. 7a shows one embodiment according to the present invention, the first catalytic region extends less than 100% of the axial length L, from the inlet end; the second catalytic region extends less than 100% of the axial length L, from the outlet end. The total length of the second and the first catalytic region is greater than the axial length L. The $3^{rd}$ catalytic region extends 100% of the axial length L and overlies the first and second catalytic regions as top layer.
Figure 7B:
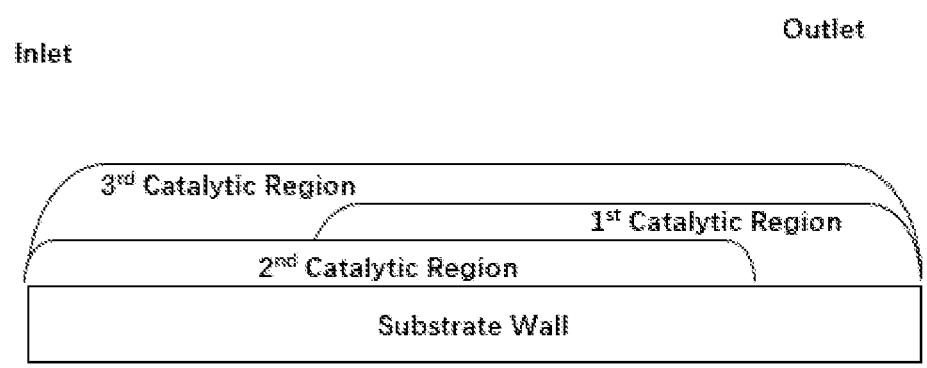
Figure 7C:
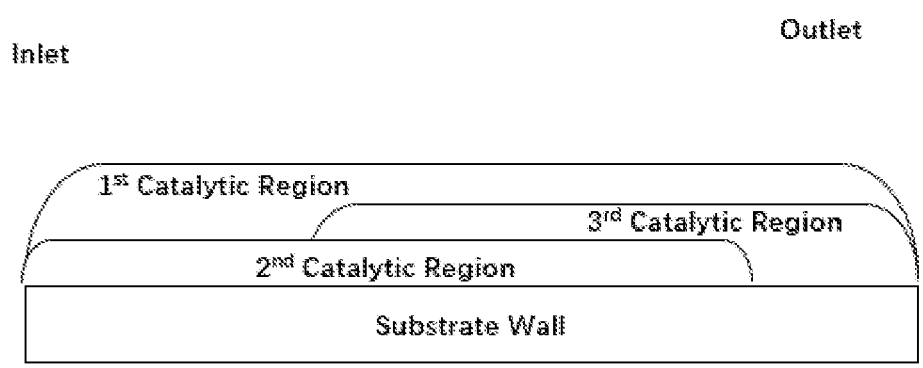
Figure 7D:
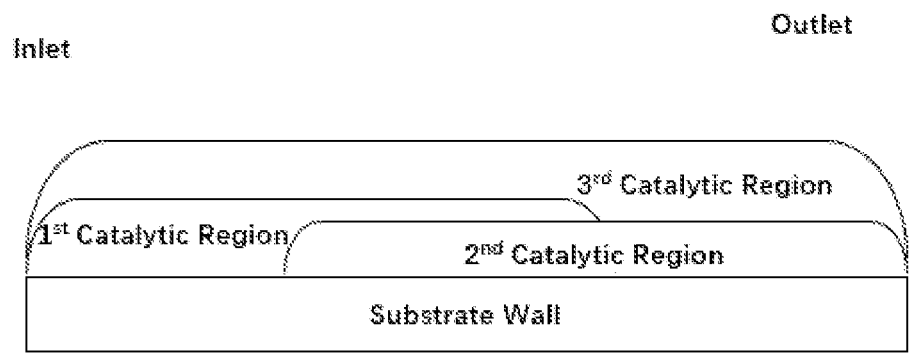
Figure 7E:
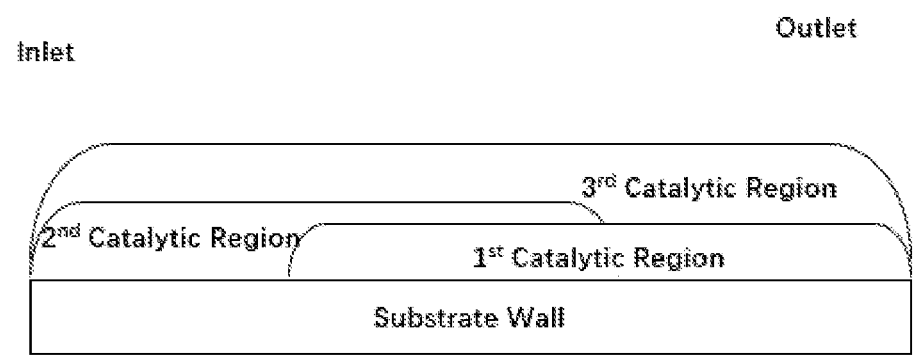
Figure 7F:
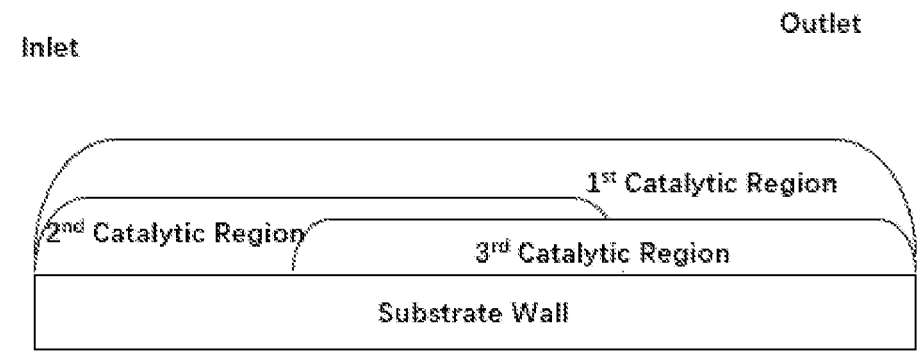
Figure 7G:
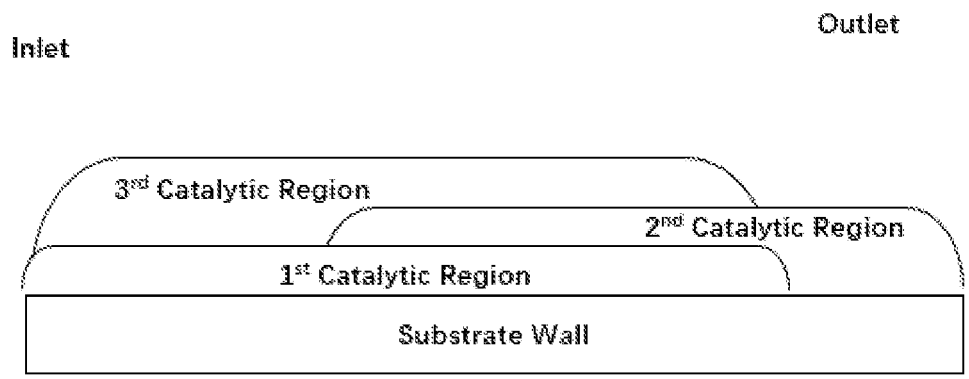
FIG. 7g shows one embodiment according to the present invention, the first catalytic region extends less than 100% of the axial length L, from the inlet end; the second catalytic region extends less than 100% of the axial length L, from the outlet end. The total length of the second and the first catalytic region can be less than, equal to, or greater than the axial length L. The $3^{rd}$ catalytic region extends less than 100% of the axial length L from the inlet end and at least partially overlies the first and/or second catalytic regions.
Figure 7H:
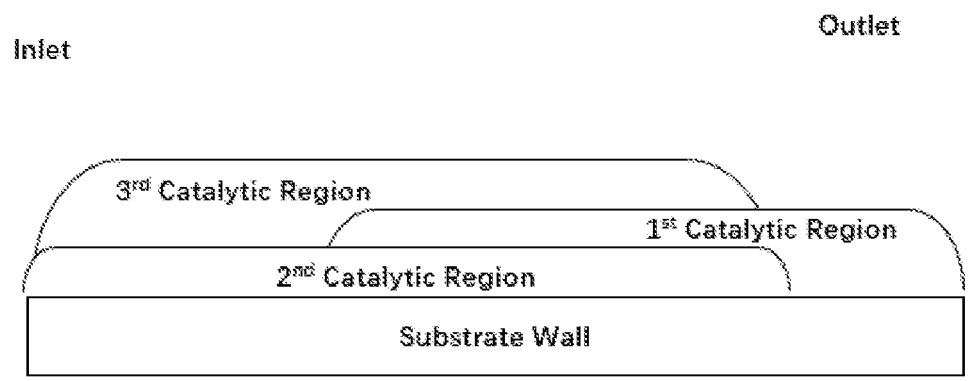
FIGS. 7h and 7i depict variations of FIG. 7g.
Figure 7I:
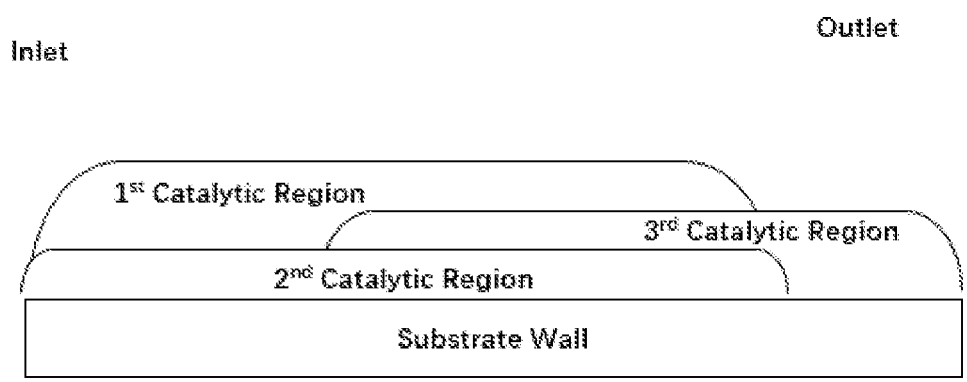
Figure 7J:
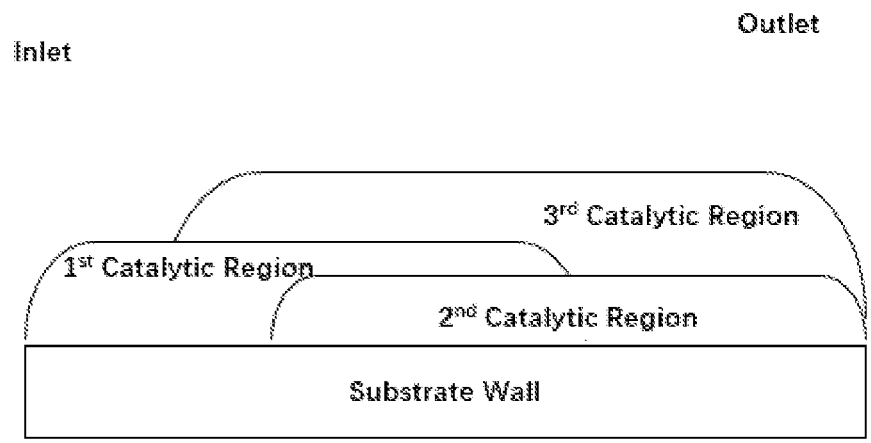
FIG. 7j shows one embodiment according to the present invention, the first catalytic region extends less than 100% of the axial length L, from the inlet end; the second catalytic region extends less than 100% of the axial length L, from the outlet end. The total length of the second and the first catalytic region can be less than, equal to, or greater than the axial length L. The $3^{rd}$ catalytic region extends less than 100% of the axial length L from the outlet end and at least partially overlies the second and/or first catalytic regions.
Figure 7K:
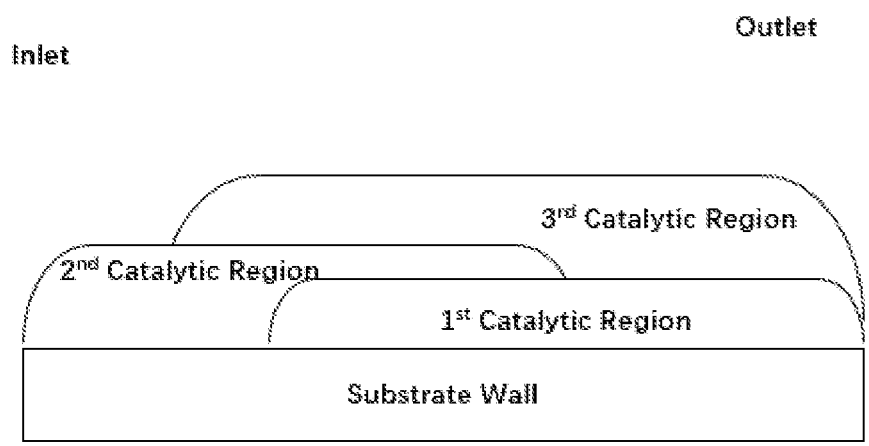
FIGS. 7k and 7l depict variations of FIG. 7j.
Figure 7L:
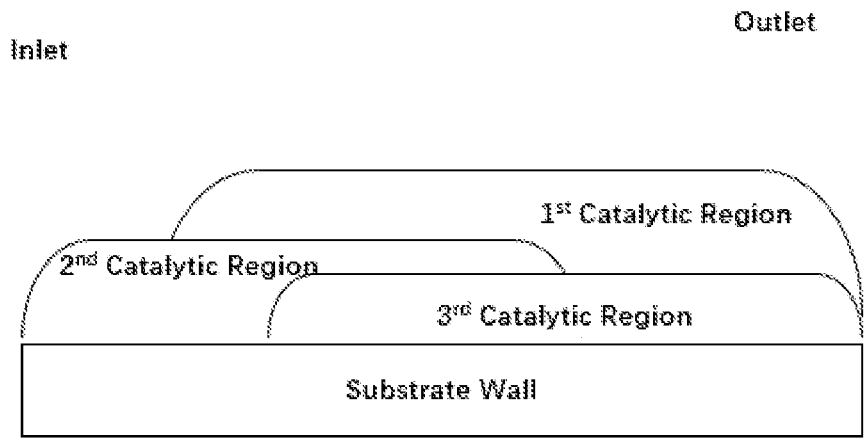

The second catalytic region can overlap with the first catalytic region for 0.1 to 99 percent of the axial length L (e.g., see FIGS. 3c and 3d, the first catalytic region can overlie the second catalytic region or the second catalytic region can overlie the first catalytic region). Alternatively, the total length of the second catalytic region and the first catalytic region can equal to the axial length L (e.g., see FIGS. 3a and 3b). In yet another alternative, total the length of the second catalytic region and the first catalytic region can be less than the axial length L, for example, no greater than 95%, 90%, 80%, or 70% of the axial length L.

In some embodiments, the first catalytic region can be supported/deposited directly on the substrate. In certain embodiments, the second catalytic region can be supported/deposited directly on the substrate.

Third Catalytic Region

The catalytic article may further comprise a third catalytic region.

The third catalytic region can further comprise a third PGM component, a third oxygen storage capacity (OSC) material, a third alkali or alkaline earth metal component, and/or a third inorganic oxide.

The third PGM component can be selected from the group consisting of platinum, palladium, rhodium, and a mixture thereof. In some embodiments, the third PGM component can be Pd, Rh or a mixture thereof.

The third OSC material is preferably selected from the group consisting of cerium oxide, zirconium oxide, a ceria-zirconia mixed oxide, and an alumina-ceria-zirconia mixed oxide. More preferably, the third OSC material comprises the ceria-zirconia mixed oxide. In addition, the third OSC material may further comprise one or more of dopants like lanthanum, neodymium, praseodymium, yttrium etc. Moreover, the third OSC material may have the function as a support material for the third PGM component. The ceria-zirconia mixed oxide can have a weight ratio of zirconia dioxide to ceria dioxide at least 50:50, preferably, higher than 60:40, more preferably, higher than 75:25. Alternatively, the ceria-zirconia mixed oxide also can have a weight ratio of ceria dioxide to zirconia dioxide less than 50:50, preferably, less than 40:60, more preferably, less than 25:75.

The third OSC material can have a fresh SSA of at least 15 m$^2$/g; at least 20 m$^2$/g; or, at least 25 m$^2$/g. The third OSC material can have a fresh SSA of no more than 55 m$^2$/g; preferably, no more than 50 or 45 m$^2$/g; no more than 40 or 35 m$^2$/g; or, no more than 30 m$^2$/g. The third OSC material can have a fresh SSA of 10-55 m$^2$/g; 20-50 m$^2$/g; 20-40 m$^2$/g; or, 20-30 m$^2$/g.

The third OSC material can be aged under various conditions. For example, the third OSC material can be aged at 1100° C. for 4 hours in an oven. The aged third OSC material under such conditions can have an SSA of at least 10 m$^2$/g, 15 m$^2$/g, or 20 m$^2$/g. The aged third OSC material under such conditions can have an SSA of 10-40 m$^2$/g, 15-35 m$^2$/g or, 20-30 m$^2$/g. The third OSC material can have an SSA difference of no more than 30 m$^2$/g, no more than 25 m$^2$/g, no more than 20 m$^2$/g, no more than 15 m$^2$/g, no more than 10 m$^2$/g, or no more than 5 m$^2$/g between the fresh third OSC material and the aged third OSC material under such conditions. Alternatively, the third OSC material can be aged under hydrothermal redox condition at 1000° C. for 4 hours. The aged third OSC material under such conditions can be an SSA of at least 10 m$^2$/g, at least 15 m$^2$/g, or at least 20 m²/g. The aged third OSC material under such conditions can have an SSA of 10-40 m²/g, 15-35 m²/g, or 20-30 m²/g. The third OSC material can have an SSA difference of no more than 40 m²/g, no more than 35 m²/g, no more than 30, 25, 20, or 15 m²/g; in certain embodiments, no more than 10 or 5 m²/g between the fresh third OSC material and the aged third OSC material under such conditions.

The third OSC material (e.g., ceria-zirconia mixed oxide) can be from 10 to 90 wt %, preferably, 25-75 wt %, more preferably, 30-60 wt %, based on the total washcoat loading of the third catalytic region.

The third OSC material loading in the third catalytic region can be less than 1.5 g/in³. In some embodiments, the third OSC material loading in the second catalytic region is no greater than 1.2 g/in³, 1.0 g/in³, 0.9 g/in³, 0.8 g/in³, or 0.7 g/in³.

The total washcoat loading of the third catalytic region can be less than 3.5 g/in³, preferably, less than 3.0 g/in³, 2.5 g/in³, or 1.5 g/in³.

The third alkali or alkaline earth metal is preferably barium, strontium, mixed oxides or composite oxides thereof. Preferably the barium or strontium, where present, is in an amount of 0.1 to 15 wt %, and more preferably 3 to 10 wt % of barium or strontium, based on the total weight of the third catalytic region.

It is even more preferable that the third alkali or alkaline earth metal is strontium. The strontium, where present, is preferably present in an amount of 0.1 to 15 wt %, and more preferably 3 to 10 wt %, based on the total weight of the third catalytic region.

It is also preferable that the third alkali or alkaline earth metal is mixed oxides or composite oxide of barium and strontium. Preferably, the mixed oxides or composite oxide of barium and strontium is present in an amount of 0.1 to 15 wt %, and more preferably 3 to 10 wt %, based on the total weight of the third catalytic region. It is more preferable that the third alkali or alkaline earth metal is composite oxide of barium and strontium.

Preferably the barium or strontium is present as $BaCO_3$ or $SrCO_3$. Such a material can be performed by any method known in the art, for example incipient wetness impregnation or spray-drying.

The third inorganic oxide is preferably an oxide of Groups 2, 3, 4, 5, 13 and 14 elements. The third inorganic oxide is preferably selected from the group consisting of alumina, magnesia, silica, ceria, barium oxides, and mixed oxides or composite oxides thereof. Particularly preferably, the third inorganic oxide is alumina, lanthanum-alumina, ceria, or a magnesia/alumina composite oxide. One especially preferred third inorganic oxide is alumina or lanthanum-alumina.

The third OSC material and the third inorganic oxide can have a weight ratio of no greater than 10:1, preferably, no greater than 8:1 or 5:1, more preferably, no greater than 4:1 or 3:1, most preferably, no greater than 2:1.

Alternatively, the third OSC material and the third inorganic oxide can have a weight ratio of 10:1 to 1:10, preferably, 8:1 to 1:8 or 5:1 to 1:5; more preferably, 4:1 to 1:4 or 3:1 to 1:3; and most preferably, 2:1 to 1:2.

The third catalytic region can extend for 100 percent of the axial length L (e.g., see FIGS. 4a-4d and 6a-6c).

The third catalytic region can be less than the axial length L, for example, no greater than 95%, 90%, 80%, or 70% of the axial length L (e.g., see FIGS. 5a-5d and 7g-7l).

The second catalytic region can overlap with the first catalytic region for 0.1 to 99 percent of the axial length L (e.g., see FIGS. 7a-7l), the first catalytic region can overlie the second catalytic region, or the second catalytic region can overlie the first catalytic region). Alternatively, the either of second or first region can extend for 30 to 70 percent of the axial length L. Preferably, for 40 to 60 percent, more preferably, 45 to 55 percent of the axial length L. and most preferably, the total length of the second and the first region is equal or less than the axial length L (e.g., see FIGS. 4a-4d).

Fourth Catalytic Region

The catalytic article may further comprise a fourth catalytic region.

The fourth catalytic region can further comprise a fourth PGM component, a fourth oxygen storage capacity (OSC) material, a fourth alkali or alkaline earth metal component, and/or a fourth inorganic oxide.

The fourth PGM component can be selected from the group consisting of platinum, palladium, rhodium, and a mixture thereof. In some embodiments, the fourth PGM component can be Pd, Rh or a mixture thereof.

The fourth catalytic region may have the same or similar composition as the third catalytic region.

The fourth catalytic region can be less than the axial length L, for example, no greater than 95%, 90%, 80%, or 70% of the axial length L.

Alternatively, either of fourth or the third catalytic region can extend for 30 to 70 percent of the axial length L. Preferably, for 40 to 60 percent, more preferably, 45 to 55 percent of the axial length L. and most preferably, the total length of the fourth and the third catalytic region is equal or greater than the axial length L (e.g., see FIGS. 5a-5d).

The catalyst article of the invention may comprise further components that are known to the skilled person. For example, the compositions of the invention may further comprise at least one binder and/or at least one surfactant. Where a binder is present, dispersible alumina binders are preferred.

Substrate

Preferably the substrate is a flow-through monolith.

The flow-through monolith substrate has a first face and a second face defining a longitudinal direction there between. The flow-through monolith substrate has a plurality of channels extending between the first face and the second face. The plurality of channels extends in the longitudinal direction and provide a plurality of inner surfaces (e.g. the surfaces of the walls defining each channel). Each of the plurality of channels has an opening at the first face and an opening at the second face. For the avoidance of doubt, the flow-through monolith substrate is not a wall flow filter.

The first face is typically at an inlet end of the substrate and the second face is at an outlet end of the substrate.

The channels may be of a constant width and each plurality of channels may have a uniform channel width.

Preferably within a plane orthogonal to the longitudinal direction, the monolith substrate has from 300 to 900 channels per square inch, preferably from 400 to 800. For example, on the first face, the density of open first channels and closed second channels is from 600 to 700 channels per square inch. The channels can have cross sections that are rectangular, square, circular, oval, triangular, hexagonal, or other polygonal shapes.

The monolith substrate acts as a support for holding catalytic material. Suitable materials for forming the monolith substrate include ceramic-like materials such as cordierite, silicon carbide, silicon nitride, zirconia, mullite, spodumene, alumina-silica magnesia or zirconium silicate, or of porous, refractory metal. Such materials and their use in the manufacture of porous monolith substrates are well known in the art.

It should be noted that the flow-through monolith substrate described herein is a single component (i.e. a single brick). Nonetheless, when forming an emission treatment system, the substrate used may be formed by adhering together a plurality of channels or by adhering together a plurality of smaller substrates as described herein. Such techniques are well known in the art, as well as suitable casings and configurations of the emission treatment system.

In embodiments wherein the catalyst article of the present comprises a ceramic substrate, the ceramic substrate may be made of any suitable refractory material, e.g., alumina, silica, ceria, zirconia, magnesia, zeolites, silicon nitride, silicon carbide, zirconium silicates, magnesium silicates, aluminosilicates and metallo aluminosilicates (such as cordierite and spodumene), or a mixture or mixed oxide of any two or more thereof. Cordierite, a magnesium aluminosilicate, and silicon carbide are particularly preferred.

In embodiments wherein the catalyst article of the present invention comprises a metallic substrate, the metallic substrate may be made of any suitable metal, and in particular heat-resistant metals and metal alloys such as titanium and stainless steel as well as ferritic alloys containing iron, nickel, chromium, and/or aluminium in addition to other trace metals.

Another aspect of the present disclosure is directed to a method for treating a vehicular exhaust gas containing $NO_x$, CO, and HC using the catalyst article described herein. Catalytic converters equipped with the TWC made according to this method show improved catalytic properties compared to conventional TWC (with the same PGM loading), also show especially improved performance in cold start stage and better THC light off performance (e.g., see Examples 2-6 and Tables 6-8, 10 and 12).

Another aspect of the present disclosure is directed to a system for treating vehicular exhaust gas comprising the catalyst article described herein in conjunction with a conduit for transferring the exhaust gas through the system.

Defintions

The "hydrothermal ageing" is a method to reproduce the deterioration state of a catalyst used in actual applications. The samples were set in an electric furnace where mixture of steam and alternating reducing/oxidation gasses shown in Table 1 are introduced.

TABLE 1

| Condition | CO (%) | $H_2$ (%) | $O_2$ (%) | $H_2O$ (%) | $N_2$ | Duration |
|---|---|---|---|---|---|---|
| Reducing | 3 | 3 | 0 | 10 | balance | 3 min |
| Oxidizing | 0 | 0 | 3 | 10 | balance | 3 min |

The term "region" as used herein refers to an area on a substrate, typically obtained by drying and/or calcining a washcoat. A "region" can, for example, be disposed or supported on a substrate as a "layer" or a "zone". The area or arrangement on a substrate is generally controlled during the process of applying the washcoat to the substrate. The "region" typically has distinct boundaries or edges (i.e. it is possible to distinguish one region from another region using conventional analytical techniques).

Typically, the "region" has a substantially uniform length. The reference to a "substantially uniform length" in this context refers to a length that does not deviate (e.g. the difference between the maximum and minimum length) by more than 10%, preferably does not deviate by more than 5%, more preferably does not deviate by more than 1%, from its mean value.

It is preferable that each "region" has a substantially uniform composition (i.e. there is no substantial difference in the composition of the washcoat when comparing one part of the region with another part of that region). Substantially uniform composition in this context refers to a material (e.g. region) where the difference in composition when comparing one part of the region with another part of the region is 5% or less, usually 2.5% or less, and most commonly 1% or less.

The term "zone" as used herein refers to a region having a length that is less than the total length of the substrate, such as ≤75% of the total length of the substrate. A "zone" typically has a length (i.e. a substantially uniform length) of at least 5% (e.g. ≥5%) of the total length of the substrate.

The total length of a substrate is the distance between its inlet end and its outlet end (e.g. the opposing ends of the substrate).

Any reference to a "zone disposed at an inlet end of the substrate" used herein refers to a zone disposed or supported on a substrate where the zone is nearer to an inlet end of the substrate than the zone is to an outlet end of the substrate. Thus, the midpoint of the zone (i.e. at half its length) is nearer to the inlet end of the substrate than the midpoint is to the outlet end of the substrate. Similarly, any reference to a "zone disposed at an outlet end of the substrate" used herein refers to a zone disposed or supported on a substrate where the zone is nearer to an outlet end of the substrate than the zone is to an inlet end of the substrate. Thus, the midpoint of the zone (i.e. at half its length) is nearer to the outlet end of the substrate than the midpoint is to the inlet end of the substrate.

When the substrate is a wall-flow filter, then generally any reference to a "zone disposed at an inlet end of the substrate" refers to a zone disposed or supported on the substrate that is:

(a) nearer to an inlet end (e.g. open end) of an inlet channel of the substrate than the zone is to a closed end (e.g. blocked or plugged end) of the inlet channel, and/or (b) nearer to a closed end (e.g. blocked or plugged end) of an outlet channel of the substrate than the zone is to an outlet end (e.g. open end) of the outlet channel. Thus, the midpoint of the zone (i.e. at half its length) is (a) nearer to an inlet end of an inlet channel of the substrate than the midpoint is to the closed end of the inlet channel, and/or (b) nearer to a closed end of an outlet channel of the substrate than the midpoint is to an outlet end of the outlet channel.

Similarly, any reference to a "zone disposed at an outlet end of the substrate" when the substrate is a wall-flow filter refers to a zone disposed or supported on the substrate that is:

(a) nearer to an outlet end (e.g. an open end) of an outlet channel of the substrate than the zone is to a closed end (e.g. blocked or plugged) of the outlet channel, and/or (b) nearer to a closed end (e.g. blocked or plugged end) of an inlet channel of the substrate than it is to an inlet end (e.g. an open end) of the inlet channel.

Thus, the midpoint of the zone (i.e. at half its length) is (a) nearer to an outlet end of an outlet channel of the substrate than the midpoint is to the closed end of the outlet channel, and/or (b) nearer to a closed end of an inlet channel of the substrate than the midpoint is to an inlet end of the inlet channel.

A zone may satisfy both (a) and (b) when the washcoat is present in the wall of the wall-flow filter (i.e. the zone is in-wall).

The term "washcoat" is well known in the art and refers to an adherent coating that is applied to a substrate usually during production of a catalyst.

The acronym "PGM" as used herein refers to "platinum group metal". The term "platinum group metal" generally refers to a metal selected from the group consisting of Ru, Rh, Pd, Os, Ir and Pt, preferably a metal selected from the group consisting of Ru, Rh, Pd, Ir and Pt. In general, the term "PGM" preferably refers to a metal selected from the group consisting of Rh, Pt and Pd.

The term "mixed oxide" as used herein generally refers to a mixture of oxides in a single phase, as is conventionally known in the art. The term "composite oxide" as used herein generally refers to a composition of oxides having more than one phase, as is conventionally known in the art.

The expression "consist essentially" as used herein limits the scope of a feature to include the specified materials or steps, and any other materials or steps that do not materially affect the basic characteristics of that feature, such as for example minor impurities. The expression "consist essentially of" embraces the expression "consisting of".

The expression "substantially free of" as used herein with reference to a material, typically in the context of the content of a region, a layer or a zone, means that the material in a minor amount, such as ≤5% by weight, preferably ≤2% by weight, more preferably ≤1% by weight. The expression "substantially free of" embraces the expression "does not comprise."

The expression "essentially free of" as used herein with reference to a material, typically in the context of the content of a region, a layer or a zone, means that the material in a trace amount, such as ≤1% by weight, preferably ≤0.5% by weight, more preferably ≤0.1% by weight. The expression "essentially free of" embraces the expression "does not comprise."

Any reference to an amount of dopant, particularly a total amount, expressed as a % by weight as used herein refers to the weight of the support material or the refractory metal oxide thereof.

The term "loading" as used herein refers to a measurement in units of g/ft$^3$ on a metal weight basis.

The following examples merely illustrate the invention. Those skilled in the art will recognize many variations that are within the spirit of the invention and scope of the claims.

EXAMPLES

Catalysts 1-4

The four catalyst samples (Table 3) were prepared by the incipient wetness impregnation method, Each of OSC1 and OSC2 materials (Table 2) in powder form was impregnated either with Pd nitrate or with Rh nitrate solution, respectively, at a target loading of 1% Pd or 0.2% Rh, then dried at 90° C. and calcined at 500° C. for 1 hour.

TABLE 2

OSC Material Compositions Used in Catalysts 1-4

| | $CeO_2$ (wt %) | $ZrO_2$ (wt %) | Fresh SSA | Aged SSA (1100° C. 4 hrs Oven) | SSA Difference between Fresh and Aged |
|---|---|---|---|---|---|
| OSC1 | 50 | 43 | 58 | 24 | 34 |
| OSC2 | 50 | 45 | 28 | 24 | 4 |

TABLE 3

Compositions of Catalysts 1-4

| Comparative Catalyst 1 | 1% Pd/OSC1 |
|---|---|
| Catalyst 2 | 1% Pd/OSC2 |
| Comparative Catalyst 3 | 0.2% Rh/OSC1 |
| Catalyst 4 | 0.2% Rh/OSC2 |

Example 1-Conversions During Stressed OSC Test

Stressed OSC time was recorded when lambda perturbing from the rich (0.94) to the lean (1.03) over the powder sample (0.4 g) with a mix gas flow rate of 5 L/min, and NO conversion is calculated through the feed gas on-line analysis when the sample tested under rich (0.94) or lean (1.03) condition at 500° C., respectively. The stressed OSC and NO conversion results are shown in Table 4 below, OSC2 shows consistently high OSC whether as a support for Pd or Rh (Catalysts 2 and 4), and Lean/Rich NO conversion gets obviously improved when Pd or Rh supported by OSC2, which indicated that Lean/Rich NO gives much correlation with the stressed OSC.

TABLE 4

OSC and NO conversion of Catalysts 1-4

| Samples | Stressed OSC (s), 0.99 ± 0.05, 500° C. | NO conversion (%), 0.99 ± 0.05, 500° C., lean | NO conversion (%), 0.99 ± 0.05, 500° C., rich |
|---|---|---|---|
| Comparative Catalyst 1 | 1.5 | 66 | 82 |
| Catalyst 2 | 1.8 | 79 | 88 |
| Comparative Catalyst 3 | 1.5 | 72 | 82 |
| Catalyst 4 | 1.7 | 80 | 87 |

TABLE 5

OSC Material Compositions Used in Catalyst A & Comparative Catalyst B

| | $CeO_2$ (%) | $ZrO_2$ (%) | Fresh SSA | Aged SSA (HTA Redox 1000° C. 4 hrs) | SSA Difference between Fresh and Aged |
|---|---|---|---|---|---|
| OSC3 | 55 | 39 | 29 | 24 | 5 |
| OSC4 | 45 | 49 | 62 | 22 | 40 |

Catalyst A:

First Catalytic Region:

The first catalytic region consists of Pd supported on a washcoat of OSC3 (Table 5) as a first CeZr mixed oxide, La-stabilized alumina, and Ba promotor. The washcoat loading of the first catalytic region was about 2.5 g/in$^3$ with a Pd loading of 50 g/ft$^3$.

This washcoat was then coated from the inlet face of a ceramic substrate (400 cpsi, 3.5 mil wall thickness) using standard coating procedures with coating depth targeted of 100% of the substrate length, dried at 90° C.

Second Catalytic Region:

The second catalytic region consists of Rh supported on a washcoat of a second CeZr mixed oxide, La-stabilized alumina, and Ba promotor. The washcoat loading of the second catalytic region was about 1.0 g/in$^3$ with a Rh loading of 5 g/ft$^3$.

This second washcoat was then coated from the outlet face of the ceramic substrate containing the first catalytic region from above, using standard coating procedures with coating depth targeted of 100% of the substrate length, dried at 90° C. and calcined at 500° C. for 45 mins.

Comparative Catalyst B:

Comparative Catalyst B is prepared according to the similar procedure as Catalyst A with the exception that in the first catalytic region, OSC4 (Table 5) was used.

Example 2: Vehicle Testing Procedures and Results

Catalyst A and Comparative Catalyst B were bench aged for 150 hours with fuel cut aging cycles, with peak temperature at 950° C. vehicle emissions were conducted over a commercial vehicle with 1.5 litre engine with FTP driving cycle. Emissions were measured pre- and post-catalyst.

TABLE 6

Results of Exhaust Emissions by Vehicle Diluted Bag Data

| | Exhaust Emissions (g/km) | | | |
|---|---|---|---|---|
| | THC | NMHC | CO/10 | NO$_x$ |
| Catalyst A | 0.020 | 0.016 | 0.067 | 0.022 |
| Comparative Catalyst B | 0.024 | 0.019 | 0.080 | 0.036 |

Bag data from the tailpipe are shown in Table 6. Catalyst A of the present invention presents lower emission of THC, CO, and NO$_x$ compared with Comparative Catalyst B (17%, 16%, and 39% reduction, respectively).

Example 3: Light Off Performances Test in Engine Testing

Catalysts A and Comparative Catalyst B were tested separately over a gasoline engine. The light off performance is a typical condition with exhaust flow rate of 81200 L/min, temperature ramp is 30° C./min, the lambda of Air and Fuel Ratio (AFR) at 14.45. the conversion of THC, CO and NO$_x$ were calculated from comparing the concentration of the feed gas and the gas at the outlets of the catalysts. Before the engine light off testing. Catalysts A and Comparative Catalyst B were bench aged for 150 hours with fuel cut aging cycles, with peak temperature at 950° C.

The HC, CO and NO$_x$ Tso light off temperatures of Catalysts A and Comparative Catalyst B are shown in Table 7. The data indicates that, surprisingly, Catalyst A of the present invention gives significantly improved light-off performance when compared with Comparative Catalyst B, with about 10° C. lower Tso (Tso is the temperature when the conversion reaching 50%).

TABLE 7

Engine Bench Light Off Test Results

| Pollutant | $T_{50}$ (° C.) Catalyst A | $T_{50}$ (° C.) Comparative Catalyst B |
|---|---|---|
| HC | 336 | 346 |
| CO | 335 | 345 |
| NO$_x$ | 336 | 345 |

Catalyst C:

First Catalytic Region:

The first catalytic region consists of Pd supported on a washcoat of OSC2 (Table 2), La-stabilized alumina, and Ba promotor. The washcoat loading of the first catalytic region was about 2.0 g/in$^3$ with a Pd loading of 77 g/ft$^3$.

This washcoat was then coated from the inlet face of a ceramic substrate (750 cpsi, 2.5 mil wall thickness) using standard coating procedures with coating depth targeted of 80% of the substrate length, dried at 90° C.

Second Catalytic Region:

The second catalytic region consists of Rh supported on a washcoat of a second CeZr mixed oxide, La-stabilized alumina. The washcoat loading of the second catalytic region was about 1.3 g/in$^3$ with a Rh loading of 8 g/ft$^3$.

This second washcoat was then coated from the outlet face of the ceramic substrate containing the first catalytic region from above, using standard coating procedures with coating depth targeted of 80% of the substrate length, dried at 90° C. and calcined at 500° C. for 45 mins.

Comparative Catalyst D:

Comparative Catalyst D is prepared according to the similar procedure as Catalyst C with the exception that in the first catalytic region, OSC1 (Table 2) was used.

Example 4: Vehicle Testing Procedures and Results

The bench aged samples of Catalyst C and Comparative Catalyst D were tested over a vehicle of 2.0-liter engine with Worldwide Light Duty Testing Procedure (WLTP). The bench aging under 6.1-L engine in the same run for 150 hrs with four mode aging cycle, with peak bed temperature at about 980° C. in the catalysts. Results of vehicle exhaust diluted bag data over the fresh and bench aged parts are shown in Table 8. Catalyst C of the present invention presents excellent activity on NO$_x$ emission control, compared with Comparative Catalyst D (e.g., see the NO$_x$ performance improved with around 60% over the fresh part, and with 28% improvement on the aged part).

TABLE 8

Results of Emissions by Vehicle Diluted Bag Data

| | Exhaust Emissions (mg/km) | | | |
|---|---|---|---|---|
| | THC | NMHC | CO/10 | NO$_x$ |
| Comparative Catalyst D-fresh | 18.3 | 15.2 | 90.8 | 36.7 |
| Catalyst C-fresh | 22.1 | 18.0 | 95.1 | 14.7 |
| Comparative Catalyst D-aged | 39.4 | 31.5 | 159.3 | 85.0 |
| Catalyst C-aged | 40.2 | 32.1 | 152.5 | 60.8 |

TABLE 9

OSC Material Composition Used in Catalyst E & Comparative Catalyst F

|  | CeO$_2$ (wt %) | ZrO$_2$ (wt %) | Fresh SSA | Aged SSA (1100° C. 4 hrs Oven) | SSA Difference between Fresh and Aged |
|---|---|---|---|---|---|
| OSC1 | 50 | 43 | 58 | 24 | 34 |
| OSC5 | 50 | 45 | 48 | 27 | 21 |

Catalyst E:
First Catalytic Region:

The first catalytic region consists of Pd supported on a washcoat of OSC5 (Table 9), La-stabilized alumina, and Ba promotor. The washcoat loading of the first catalytic region was about 2.7 g/in$^3$ with a Pd loading of 83 g/ft$^3$.

This washcoat was then coated from the inlet face of a ceramic substrate (750 cpsi, 2.5 mil wall thickness) using standard coating procedures with coating depth targeted of 100% of the substrate length, dried at 90° C.

Second Catalytic Region:

The second catalytic region consists of Rh supported on a washcoat of a second CeZr mixed oxide, La-stabilized alumina, and Ba promotor. The washcoat loading of the second catalytic region was about 1.4 g/in$^3$ with a Rh loading of 5 g/ft$^3$.

This second washcoat was then coated from the outlet face of the ceramic substrate containing the first catalytic region from above, using standard coating procedures with coating depth targeted of 100% of the substrate length, dried at 90° C. and calcined at 500° C. for 45 mins.

Comparative Catalyst F:

Comparative Catalyst F is prepared according to the similar procedure as Catalyst E with the exception that in the first catalytic region, OSC1 was used.

Example 5: Vehicle Testing Procedures and Results

Catalyst E and Comparative Catalyst F were compared for their performance in treating an exhaust gas from a gasoline engine as System E and Comparative System F. In either of the Systems, the exhaust system consists of two separate catalytic bricks. Catalyst E or Comparative Catalyst F was placed in the upstream location, but a common catalyst was placed in the downstream location.

The catalyst systems (System E and Comparative System F) were subjected to an accelerated aging to an equivalent of 150000 miles. Once aged, the catalyst articles were tested using a 2014MY 2.0L GTDI passenger car under the Federal Test Procedure (FTP). The levels of NO$_x$, non-methane hydrocarbons (NMHC) and CO leaving the downstream brick were measured during the treatment process.

TABLE 10

FTP Testing Results for System E and Comparative System F

| | FTP testing | | | |
|---|---|---|---|---|
| Example | NMHC (mg/mile) | NO$_x$ (mg/mile) | NMHC + NO$_x$ (mg/mile) | CO (mg/mile) |
| System E | 40 | 24 | 64 | 907 |
| Comparative System F | 75 | 45 | 120 | 1232 |

As shown in Table 10, System E demonstrated nearly 50% tailpipe NMHC+NO$_x$ emissions, and less than 75% tailpipe CO emissions compared to Comparative System F.

TABLE 11

OSC Material Composition Used in Catalyst G & Comparative Catalyst H

|  | CeO$_2$ (wt %) | ZrO$_2$ (wt %) | Fresh SSA | Aged SSA (1100° C. 4 hrs Oven) | SSA Difference between Fresh and Aged |
|---|---|---|---|---|---|
| OSC2 | 50 | 45 | 28 | 24 | 4 |
| OSC6 | 30 | 62 | 75 | 23 | 52 |

Catalyst G:
First Catalytic Region:

The first catalytic region consists of Pd supported on a washcoat of OSC2, La-stabilized alumina, and Ba promotor. The washcoat loading of the first catalytic region was about 2.0 g/in$^3$ with a Pd loading of 85 g/ft$^3$.

This washcoat was then coated from the inlet face of a ceramic substrate (750 cpsi, 2.5 mil wall thickness) using standard coating procedures with coating depth targeted of 50% of the substrate length, dried at 90° C.

Second Catalytic Region:

The second catalytic region consists of Pd supported on a washcoat of OSC2 mixed oxide, La-stabilized alumina, and Ba promotor. The washcoat loading of the second catalytic region was about 2.0 g/in$^3$ with a Pd loading of 6 g/ft$^3$.

This second washcoat was then coated from the outlet face of the ceramic substrate containing the first catalytic region from above, using standard coating procedures with coating depth targeted of 50% of the substrate length, dried at 90° C. and calcined at 500° C. for 45 mins.

Third Catalytic Region:

The third catalytic region consists of Rh supported on a washcoat of a third CeZr mixed oxide and La-stabilized alumina. The washcoat loading of the third catalytic region was about 1.5 g/in$^3$ with a Rh loading of 9 g/ft$^3$.

The third washcoat was then coated from the outlet face of the ceramic substrate containing the first and the second catalytic regions from above, using standard coating procedures with total coating depth targeted of 100% of the substrate length, dried at 90° C. and calcined at 500° C. for 45 mins.

Comparative Catalyst H:

Comparative Catalyst H is prepared according to the similar procedure as Catalyst G with the exception that OSC6 (Table 11) was used in the first and second catalytic regions.

Example 6: Vehicle Testing Procedures and Results

The bench aged samples of Catalyst G and Comparative Catalyst H were tested over a vehicle of 2.0-liter engine with Worldwide Light Duty Testing Procedure (WLTP). The bench aging under 6.1-L engine in the same run for 200 hrs with four mode aging cycle, with peak bed temperature at about 980° C. of the catalysts. Results of vehicle exhaust diluted bag data are shown in Table 12. Catalyst G of the present invention presents excellent NOx performance, compared with Comparative Catalyst H (e.g., see the NO$_x$ improved performance around 18% improvement on the aged part).

TABLE 12

Results of Emissions by Vehicle Diluted Bag Data

| | Exhaust Emissions (mg/km) | | | |
|---|---|---|---|---|
| | THC | NMHC | CO/10 | $NO_x$ |
| Catalyst G-aged | 34.9 | 25.8 | 86.2 | 26.9 |
| Comparative Catalyst H-aged | 37.5 | 27.7 | 81.9 | 32.8 |

We claim:

1. A catalyst composition comprising a platinum group metal (PGM) component and an oxygen storage capacity (OSC) material, wherein the OSC material has a fresh specific surface area (SSA) of at least 10 m²/g and no more than 55 m²/g; wherein the OSC material when aged, has an SSA of at least 10 m²/g; and wherein the OSC material has an SSA difference of no more than 30 m²/g between the fresh OSC material and the aged OSC material.

2. The catalyst composition of claim 1, wherein the OSC material has a fresh SSA of at least 20 m²/g.

3. The catalyst composition of claim 1, wherein the PGM component is selected from the group consisting of platinum, palladium, rhodium, and a mixture thereof.

4. The catalyst composition of claim 1, wherein the aged OSC material is aged at 1100° C. for 4 hours.

5. The catalyst composition of claim 1, wherein the aged OSC material is aged under hydrothermal redox condition at 1000° C. for 4 hours.

6. The catalyst composition of claim 1 is a three-way catalyst (TWC).

7. The catalyst composition of claim 1, wherein the OSC material when aged, has an SSA of at least 15 m²/g.

8. The catalyst composition of claim 1, wherein the OSC material has an SSA difference of no more than 25 m²/g between the fresh OSC material and the aged OSC material.

9. A catalytic article for treating exhaust gas comprising:
a substrate comprising an inlet end and an outlet end with an axial length L;
a first catalytic region comprising a first platinum group metal (PGM) component and a first oxygen storage capacity (OSC) material, wherein the first OSC material has a fresh specific surface area (SSA) of at least 10 m²/g and no more than 55 m²/g; wherein the first OSC material when aged, has an SSA of at least 10 m²/g;
and wherein the first OSC material has an SSA difference of no more than 30 m²/g between the fresh first OSC material and the aged first OSC material.

10. The catalytic article of claim 9, wherein the first OSC material has a fresh SSA of at least 20 m²/g.

11. The catalytic article of claim 9, wherein the first PGM component is selected from the group consisting of platinum, palladium, rhodium, and a mixture thereof.

12. The catalytic article of claim 9, wherein the aged first OSC material is aged at 1100° C. for 4 hours.

13. The catalytic article of claim 9, wherein the aged first OSC material is aged under hydrothermal redox condition at 1000° C. for 4 hours.

14. The catalytic article of claim 9, wherein the first catalytic region is a three-way catalyst (TWC).

15. The catalytic article of claim 9, further comprising a second catalytic region.

16. The catalytic article of claim 15, wherein the first catalytic region is supported/deposited directly on the substrate.

17. The catalytic article of claim 15, wherein the second catalytic region is supported/deposited directly on the substrate.

18. The catalytic article of claim 15, further comprising a third catalytic region.

19. The catalytic article of claim 9, wherein the first OSC material when aged, has an SSA of at least 15 m²/g.

20. The catalytic article of claim 9, wherein the first OSC material has an SSA of no more than 25 m²/g between the fresh first OSC material and the aged first OSC material.

* * * * *